Figure 1:
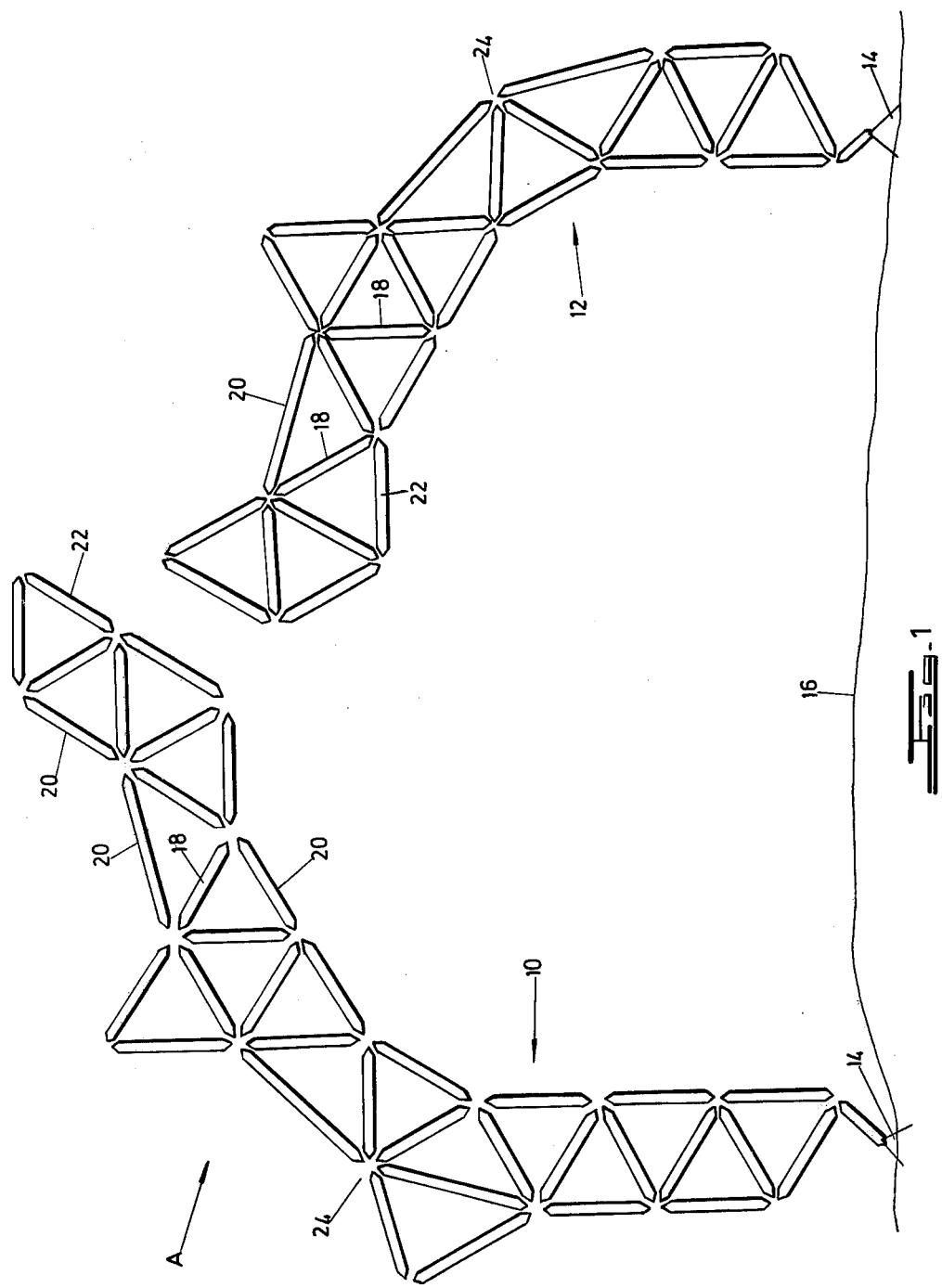

United States Patent [19]
Watson

[11] 4,023,370
[45] May 17, 1977

[54] FLOATING BREAKWATER

[76] Inventor: James Gabriel Oliver Watson, 11 Cull Ross Road, Bryanston, Sandton, Transvaal, South Africa

[22] Filed: May 29, 1975

[21] Appl. No.: 581,862

[30] Foreign Application Priority Data

June 4, 1974 South Africa ............. 74/3522

[52] U.S. Cl. ............................. 61/5; 61/3
[51] Int. Cl.² ............................. E02B 3/04
[58] Field of Search .............. 61/5, 1 F, 37, 46, .5, 61/1 R, 3, 4; 210/242, DIG. 25, DIG. 26

[56] References Cited
UNITED STATES PATENTS

| | | | |
|---|---|---|---|
| 436,644 | 9/1890 | White | 61/5 |
| 1,846,278 | 2/1932 | Roane | 61/5 |
| 2,044,795 | 6/1936 | Knight | 61/5 |
| 3,276,209 | 10/1966 | Mosdell | 61/5 |
| 3,276,210 | 10/1966 | Stitt | 61/5 |
| 3,444,693 | 5/1969 | Busey | 61/5 |
| 3,465,528 | 9/1969 | Usab | 61/5 |
| 3,592,008 | 7/1971 | Trindle | 61/5 X |
| 3,640,075 | 2/1972 | La Peyre | 61/5 |
| 3,777,689 | 12/1973 | Olsen et al. | 61/5 X |

*Primary Examiner*—Dennis L. Taylor
*Attorney, Agent, or Firm*—Young & Thompson

[57] ABSTRACT

This invention relates to a floating breakwater comprising an elongated floating body which has a width related to the length of waves to be attenuated. The surface of the breakwater parallel to the water includes a plurality of openings which enclose bodies of water which are preferably of triangular or other non rectangular shape.

8 Claims, 12 Drawing Figures

U.S. Patent  May 17, 1977  Sheet 1 of 5  4,023,370

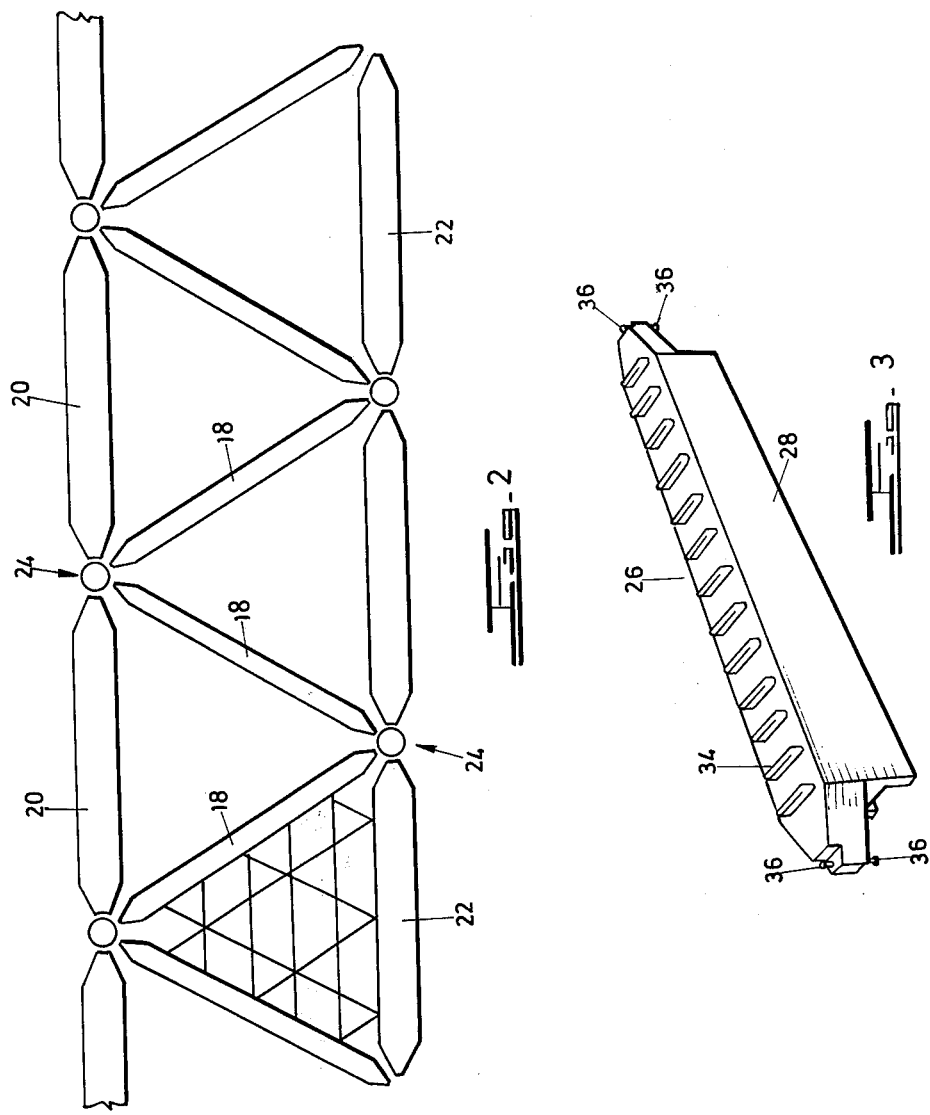

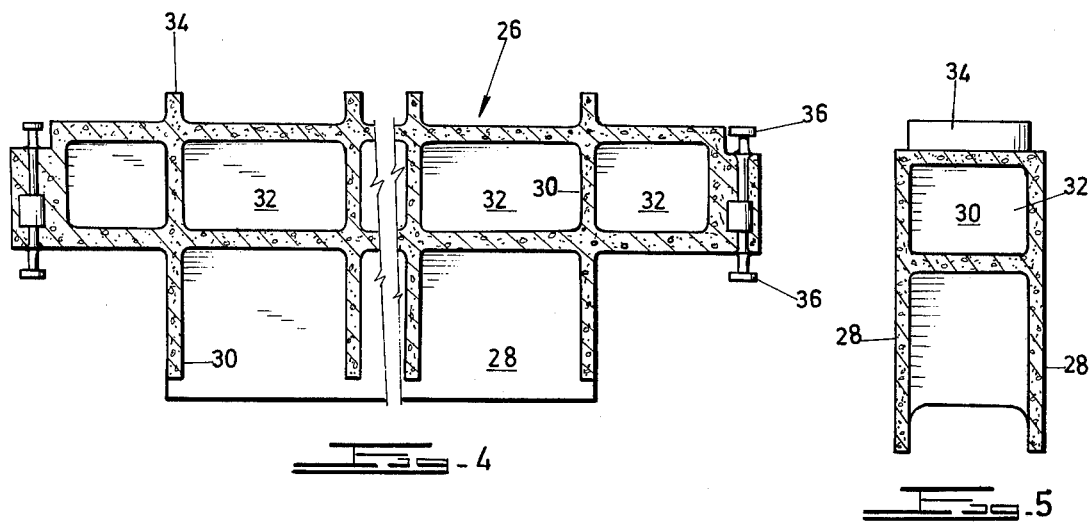
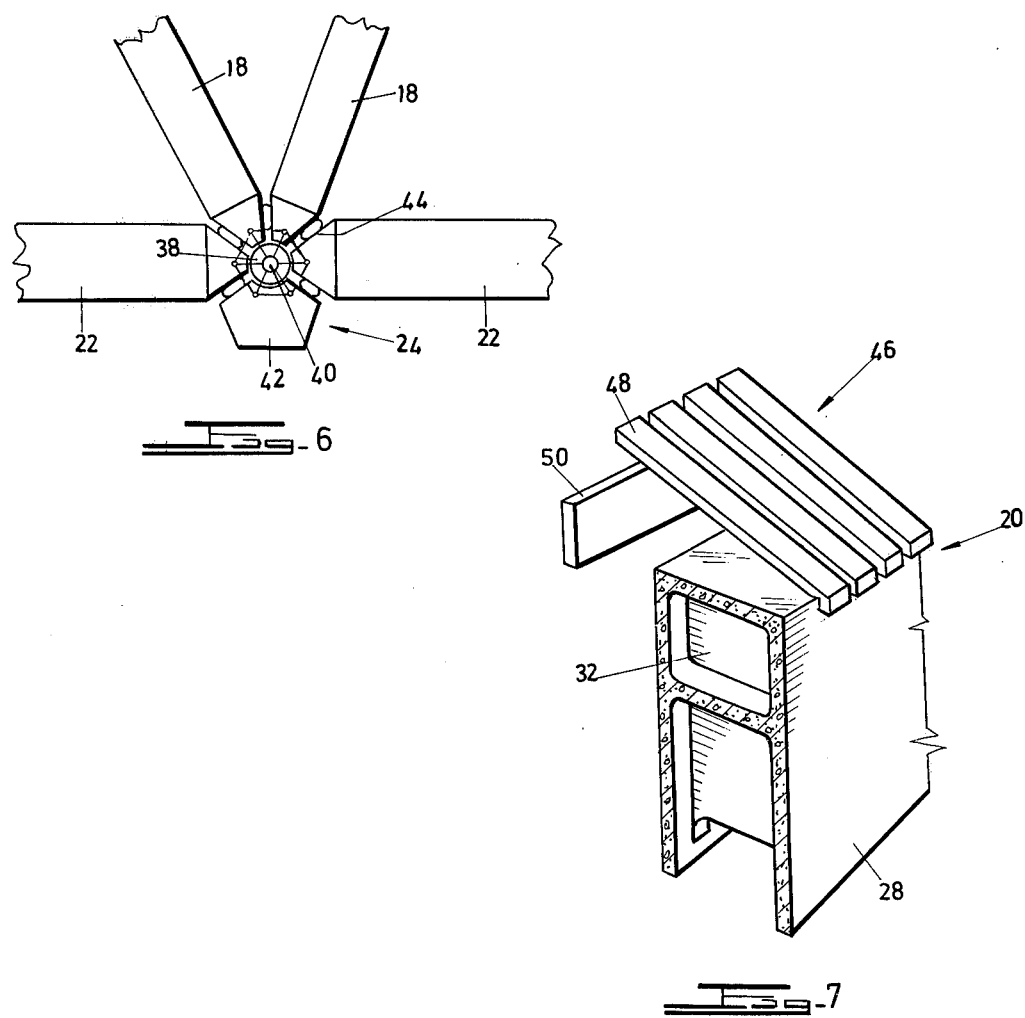

FLOATING BREAKWATER

This invention relates to a floating breakwater.

Wave motion in fluids is a complex phenomenon and the ocean waves to which marine structures are subjected are imperfectly understood. They are non-uniform in three dimensions and in time, i.e. the vertical distance from the trough to the crest varies from wave to wave, the distance along a crest for which a wave may be distinguished varies and the fluctuation of the surface at a point varies with time. In nature wave trains are not of infinite extent, they rather consist of groups of waves moving irregularly in many directions without alignment of a series of crests.

The object of a breakwater is to reduce and if possible eliminate untoward water motions to produce calm conditions or at least acceptable limits of such motions for the purposes of mooring, increasing work time, confining and collecting oil slick, etc. To do this, it is necessary to reduce wave motion particularly the heights of waves by the dissipation of wave energy.

Three fundamental methods of wave reduction are:
a. Total reflection
b. Out of phase damping
c. Forced instability However, there are in addition, other factors to consider including the orbital motion of water particles in waves, the effects of eddies, gravitation, spray, friction, boundary layer separation, viscosity and turbulence.

Floating breakwaters are well known; few have actually been built but various alternative proposals consisting of variants of: (1) rigid floating breakwaters, such as pontoons or floating platforms and floating sloping barriers (2) flexible structures such as floating membranes, water or air filled bags and (3) pneumatic and hydraulic breakwaters among others, have been proposed and tested mainly under laboratory conditions. Many and in fact most of the known proposals present enormous practical constructional difficulties and no single method of wave attenuation by means of a floating breakwater stands out as the obvious answer to the problems which have been encountered and none has achieved an outstanding breakthrough in terms of combined simplicity, economy, performance and durability.

The problems associated with known floating breakwaters are principally undue oscillation of the breakwater, insufficient reduction of the transmitted wave, structural failures of the floating structures, undue stressing of the moorings and general maintenance, quite apart from economy of construction and operation.

A floating breakwater that was constructed and tried in practice was the Bombardon Floating Breakwater used in the Normandy invasion. This breakwater was constructed of steel plate and was a hollow cruciform in cross section. The buoyancy of the structure was such that the cross arms always remained below the water surface. This was done by partially filling the structure with water. This breakwater effected a reduction in the height of the waves by 50 percent but failed in a severe storm. One problem associated with this structure was that large torsional stresses were induced in the structure by waves approaching at an angle rather than directly or head-on to the structure. From tests conducted at the University of Tokyo, it is, however, clear that a resonance condition by the wave on the breakwater was the main reason for the destruction of this breakwater.

The Bombardon breakwater used principally Out-of-Phase damping.

A second breakwater, involving the use of a pontoon-type floating structure, is that actually constructed at Ondo Fishing Port, Hiroshima Prefecture, Japan. A model of the actual installation was tested, also at the University of Tokyo, in a wind/wave tank to simulate natural conditions. It was found that when the period of the incident wave exceeded that of the pontoon, almost all the incident waves would push through the floating body without any transformation but when the period of incident waves was less than that of the body almost all of the energy of the incident waves was reflected. However, under resonant conditions, i.e. when the force and body periods equalled each other, the amplitude of motion was excessive and the anchoring force also became extremely large. A series of tests proved, amongst other things, that the length of the anchoring chain has little effect on attenuation, that the period of oscillation of the breakwater should be considerably larger than that of the indicent waves. It is, however, difficult, if not totally impractical, to construct a pontoon with such a long period of natural oscillation.

It is the object of this invention to provide a floating breakwater which has greater properties of wave attenuation than known breakwaters and which is of relatively simple constructional design.

A floating breakwater according to the invention comprises a buoyant structure including a plurality of open spaces the sides of which join each other at angles other than right angles and each of which encloses a body of surface water. Preferably the structure is composed of a plurality of joined bodies at least some of which are buoyant and surfaces of which form sides of the spaces.

In one form of the invention the bodies are elongated and are joined at their ends to form triangular spaces. Conveniently the distance separating the base and apex of each triangular space is substantially the same and the bodies are so arranged in the structure that adjacent spaces have an opposite aspect to provide the structure with a continuous substantially parallel sea and lee wall. In a preferred form of the breakwater the bodies are so joined so that each is movable relatively to the other.

Figure 8:
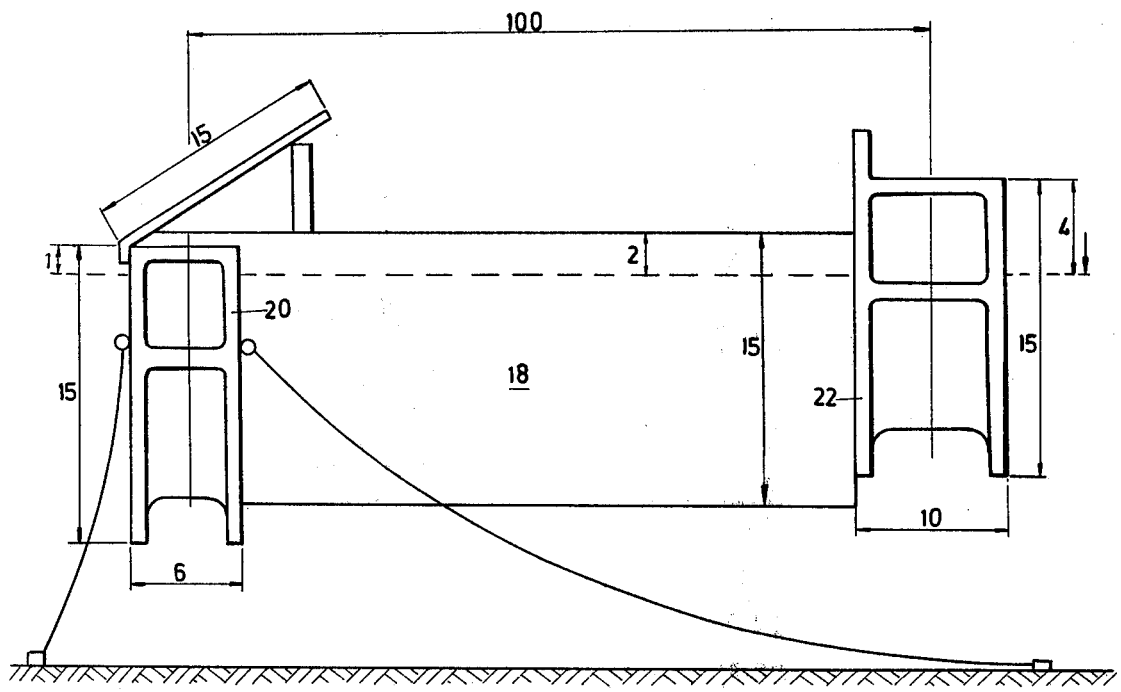
Figure 9:
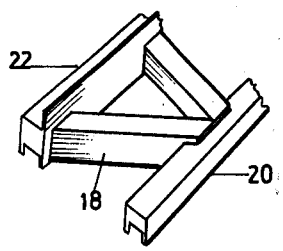
Figure 10:
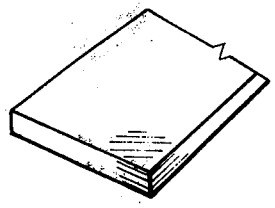
Figure 11:
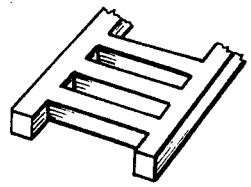

An embodiment of the invention is now described by way of example with reference to the drawings in which:

FIG. 1 is a diagrammatic plan view of a harbour constructed by means of two breakwaters of the invention, FIG. 2 is a fragmentary plan view of the breakwater, FIG. 3 is a perspective view from above of a pontoon, FIG. 4 is a shortened sectional side elevation of the pontoon of FIG. 3, FIG. 5 is a sectional end view of the pontoon of FIGS. 3 and 4, FIG. 6 is an enlarged fragmentary plan view illustrating the method of connection of the various components of the breakwater, FIG. 7 is a fragmentary perspective view of the pontoon of FIGS. 4 to 6 including a beach, FIG. 8 is a shortened sectional side elevation of a model of the breakwater of the invention, FIG. 9 is a fragmentary perspective view from above of a model of the breakwater of the invention, FIG. 10 is a fragmentary perspective view of a plain rectangular model of a pontoon type breakwater, and FIG. 11 is a perspective view of a model similar to that of FIG. 10 including transverse slots which are open top and bottom.

Figure 12:
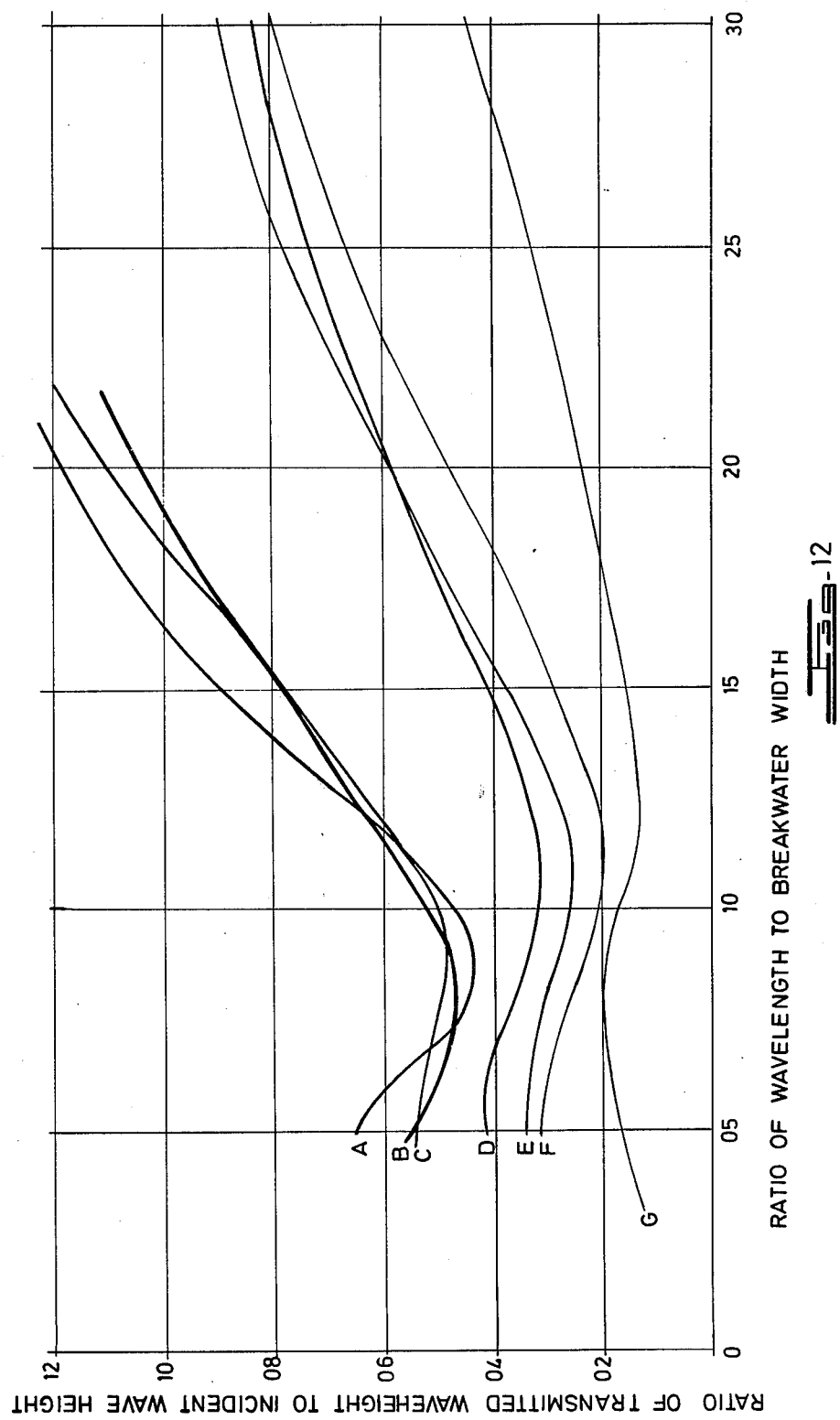

FIG. 12 is a graph illustrating the wave attenuation properties of floating bodies, fragmentary perspective views of which are shown in FIGS. 9 to 11.

Referring to FIG. 1, the harbour is shown to consist of two articulated floating breakwaters 10 and 12 each of which is flexibly anchored to fixed structure 14 on a coast line 16.

As is more clearly seen in FIG. 2 the breakwaters each consist of a plurality of individually buoyant pontoons 18, 20 and 22 the ends of which are joined at 24 to provide an open triangulated lattice like structure. As is seen in the drawing the pontoons 20 and 22 are, in plan, larger in width than the intermediate pontoons 18. The pontoons bounding the open triangular spaces are preferably tied by cables as illustrated in the first space in FIG. 2.

The pontoons in this embodiment, are each made from prestressed ferro concrete and are shown in FIGS. 3 to 5 to consist of, a hull 26, two downwardly depending skirts 28, and bulkheads 30 which extend from the deck of the hull, through its base and down between the skirts.

In the hull, the bulkheads form water tight compartments 32 most of which contain suitable water exhaust and inlet ports, and valves, not shown, to enable the buoyancy of each pontoon of the structure to be made adjustable.

The deck of some of the pontoons and particularly the intermediate pontoons carry a series of upstanding wave spoilers 34, which, in this embodiment are fixed to the deck normal to the longitudinal axis of the pontoon.

The tips of the pontoons are tapered, stepped and the ends made slightly concave as seen in FIG. 3. Bollards 36 extend from above and below the stepped ends of the pontoons and are suitably anchored in the concrete of the hull.

Each joint 24 between the pontoons in the structure, as seen in FIG. 6, includes an inflatable annular rubber buffer 38 through which a heavy central bollard 40 passes. The ends of the pontoons in the joint are curved complimentally to the radius of curvature of the buffers 38 and are arranged about and abutting the buffers as shown in the drawing.

The upper and lower bollards 36 on each pontoon are joined to those of adjacent pontoons and the central bollard 40 by means of a chain or cable. A hollow body 42 which is shaped as shown in the drawing and includes two bollards on both its upper and lower surfaces is located by cables or chains on the outside of the joint and is employed to resolve the tied forces in the joint. Secondary rubber buffers 44 which are preferably also inflatable to a degree are located in the spaces between the radially disposed members of the joint.

As the lengths of cable or chain joining the bollards 36 and 40 are of a fixed length the vertical flexibility of the joint, in other words the amount by which the broken end of any pontoon in the joint in FIG. 6 can be raised or lowered vertically, relatively to the remaining components of the joint, may be varied by varying the air pressure in the buffer 38.

As will be appreciated from what has been said above and from FIG. 6 the pontoons in each joint of the structure are slightly movable in a rotational direction about the bollard 40 as well as torsionally against the buffers 44 relatively to the remaining members of the joint. Also, as mentioned above, each pontoon is, as well, in effect pivotally connected in the joint to the buffers 38 so that the ends not shown in FIG. 6 are as mentioned above, vertically movable relatively to the joint. By means of the joints 24 between the pontoons each breakwater is articulated over its length and results in a dynamically movable structure.

In addition to the constructional features described above ancillary components could be added to the pontoons further to attenuate surface wave motion. For example, FIG. 7 shows a pontoon 20 to include a beach spoiler 46 which is fixed to and is inclined upwardly from the upper surface of the pontoon at an angle of about 30°. The beach spoiler consists of a plurality of spaced members 48 the upper ends of which are supported on a beam 50 which extends movably across the intermediate pontoons 18.

The pontoons 22 could include a vertically projecting splash board which extends over substantially the entire length of the pontoon.

In use and referring to FIG. 1 the direction A is established from a wave arising from conditions local to the site at which a harbour is to be constructed and indicates the predominant direction of wave advance at the site.

The breakwaters 10 and 12 are constructed to the proportions shown in FIG. 8. From wave data relating to the site critical wave length and heights are selected for attenuation to a specified limit. This may be called the design wave length of the breakwater and half of which is equal to the dimension 100 which is the general reference for the remaining proportions.

The breakwaters are arranged as shown on the drawing with the pontoons 20 and 22 respectively forming continuous sea and lee walls. A sheltered gap is provided between the breakwaters to provide a mouth for the harbour.

The breakwaters are anchored by means of chains or cables to fixed structures on the sea bed as illustrated in FIG. 8. The length of each chain or cable is at its point of anchorage 4 to 5 times the mean water depth at the point of anchorage.

Parameters such as the relative buoyancy of the pontoons 20 and 22, the flexibility of the joints 24 and the anchoring arrangements used at a particular harbour site will depend on the wave conditions likely to be encountered at the site and will vary from site to site and have to be predetermined.

Field and laboratory tests were carried out using a model of the breakwater of the invention. As wind generated waves are generally random and short crested and seldom exhibit the regular sinusoidal, trochoidal or other pure mathematical wave shape possible under controlled laboratory conditions the field tests were conducted as a comparison to the laboratory tests in bodies of open water, each of which had a substantial fetch. A further reason for conducting the field tests was to compare the effects of attenuation of the structure on the varying characteristics of shallow and deep water waves which have a wide spectrum of motions.

Laboratory tests were carried out in the wave generating flume in the hydraulics laboratory of the University of the Witwatersrand, Johannesburg, South Africa.

The model of the invention which was tested was that illustrated fragmentally in FIG. 9. The model was made to a scale of 1:100 from wooden elements corresponding to pontoons 18, 20 and 22 of the breakwater described above and the joints between the elements were made variably flexible. The model was constructed substantially to the proportions shown in FIG. 8. The pontoon 20 was made less buoyant than the pontoon 22 and the beach 48 was omitted from the model.

During the laboratory tests comparisons were made between the models shown in FIGS. 9 to 11. The models were all identically dimensioned in plan.

Two pontoon or floating platform type models such as that illustrated in FIG. 10 were tested with the second model of this type having a substantially greater mass and depth than the first.

The fourth model tested was of open beam and strake construction such as that illustrated in FIG. 11.

The models were identically moored by two lines from underneath and near their extreme downstream edges.

During the laboratory experiments an attempt to obtain ratios of wave lengths to width of model of 0.5:1, 1:1, 1.5:1, 2:1 and 3:1 and for each of these ratios a ratio of wave height to wave length of 1:7, 1:10 and 1:13 was attempted.

A series of still photographs were taken through the side, glass panel of the flume of these undisturbed waves.

At no time was the speed or stroke of the wave generator altered during the testing of any one particular wave once it had been set and photographed in the undisturbed state.

For each of the waves the six models were placed in the water in turn, and photographs were taken of the transmitted waves.

Photographs were also taken in front of the models for later evaluation of reflection from the model.

Cine photographs of model behaviour were taken from both the side and above the flume for a qualitative evaluation.

In each case the models were placed in the same position in the flume and photographs were taken at the same relative points. All still photographs were taken against a graduated scale on the glass wall of the flume.

The results of both the field tests on the model of the breakwater of the invention and the laboratory tests on the models illustrated in FIGS. 10 and 11 are plotted on the graph of FIG. 8.

The vertical axis of the graph represents the ratio of transmitted wave height to incident wave height and the horizontal axis the ratio of wave length to breakwater width.

Graph A plots the performance of the model illustrated in FIG. 10. Here it is seen that the wave attenuation properties of the breakwater drop off rather sharply when the wave length exceeds the breakwater width.

Graph B illustrated the performance of the pontoon having a higher mass and depth than the first and is seen to have a slightly better performance than the first model.

Graph C is the performance curve of the model illustrated in FIG. 11. Up to a wavelength/breakwater ratio of about 1.3 or 1.4 the performance is improved over both graphs 1 and 2 and this is probably an indication of the additional dissipation of energy provided by the slots in the model. Oscillation of the model did, as in the previous two models tested, become so excessive above a ratio of about 1:25 that the attenuation properties of the model fell off rapidly above this ratio.

Three versions of the model of FIG. 9 were tested. In the first, Graph E, the elements 18, 20 and 22 were tied to make the structure rigid. In the second, Graph F, the joints were loosened to provide limited flexibility of the structure and in the third, Graph D, the joints were loosened further to provide extreme flexibility. Graph G illustrates the results obtained from the model of the invention during field tests.

As is appreciated from Graphs D, E and F the wave attenuation properties of the model of the invention with varying degrees of flexibility are considerably improved over a wider spectrum of wave lengths than those of the previously tested models. The best results being those obtained with the semi-flexible model, Graph F.

The model used to obtain Graph G was of limited flexibility as was the model used to obtain Graph F and although Graph G was obtained under different conditions to those of Graphs A to F it nonetheless shows a correlation with Graphs D to F and encouragingly improved performance under open water conditions which correspond more closely to those of natural ocean wave motions.

In both the field and laboratory tests, despite controlled conditions in the laboratory and the use of known statistical techniques, there was, as is common in the art, a considerable scatter of results, and although great care was exercised in plotting graphs A to G it must be borne in mind that these statistical trend lines were plotted for puposes of comparison.

From the tests, both in open water and in the laboratory flume and from the still photographs and cine films it appears that the wave attenuation processes of the breakwater of the invention are as follows:

The attenuation of smaller waves appears to be achieved principally by reflection by pontoons 20 of the waves to seaward and also by out of phase damping within the open triangles and below the floating structure.

A complex set of random motions within the triangles was observed and these motions increased with the amplitude of the incident wave prior to overtopping of the pontoons 20.

Higher waves which overtopped the pontoons 20 although partially attenuated by reflection entered the triangular spaces further to complicate the random motions with turbulence, eddies and friction caused by the forced instability of the overtopping wave.

It seems that lateral and oblique reflections from the angular boundary walls of the triangular spaces further dissipate the remaining energies within these spaces.

This complex interaction was scarcely apparent within the open spaces of the breakwater of FIG. 11. It is obvious that such interaction is not possible in the two pontoon models of FIGS. 10 and 11.

A factor which seemed to contribute significantly to the performance of the breakwater at wavelengths longer than the breakwater width was that the differentiated buoyancy of the sea and lee walls of the invention inhibited the breakwater from oscillating at frequencies detrimental to its performance.

Another factor of importance is that the degree of attenuation by the triangular configuration was scarcely affected in any way by variations in the angles of direction of wave motion.

I claim:

1. A floating breakwater including a plurality of rigid bodies that are elongated when viewed from above, at least some of which are buoyant, means joining the ends of a plurality of the bodies in end-to-end relationship to form a sea wall, means joining the ends of another plurality of the bodies in end-to-end relationship to form a lee wall parallel to but spaced from said sea wall, and a plurality of rigid substantially submerged members attached to and extending between and interconnecting said sea and lee walls to define between said members and said walls horizontally enclosed upwardly and downwardly open water spaces which extend between the walls, the surfaces of said bodies and members that define said spaces being planar, rigid and substantially impervious to the flow of water, said members being elongated when viewed from above and so arranged that no two sides of a said space are parallel to each other, whereby wave motion entering said spaces produces a complex set of random motions of the water within said spaces thereby to dissipate wave energy within said spaces.

2. A floating breakwater as claimed in claim 1 in which the members between the walls are so arranged that said spaces are triangular in plan and adjacent triangles are of opposite aspect.

3. A floating breakwater as claimed in claim 1 in which the bodies which constitute the sea and lee walls have different densities relative to water so that one wall is more buoyant than the other.

4. A floating breakwater as claimed in claim 3, in which the bodies which constitute the sea wall are less buoyant than those of the lee wall.

5. A floating breakwater as claimed in claim 1 in which the means joining the ends of the bodies are buffers made from a resilient material and to which the bodies are tied by flexible means.

6. A floating breakwater as claimed in claim 1 in which the bodies are made from concrete and include water tight compartments.

7. A floating breakwater as claimed in claim 1 in which said surfaces are perpendicular to the surface of the water in use.

8. A floating breakwater as claimed in claim 1 in which the lower edges of said bodies and members are horizontal in use.

* * * * *